US012627626B2

(12) United States Patent
Singh et al.

(10) Patent No.: US 12,627,626 B2
(45) Date of Patent: May 12, 2026

(54) METHOD AND SYSTEM FOR DYNAMICALLY TRANSMITTING MESSAGES TO WORKFLOW APPLICATIONS

(71) Applicant: Honeywell International Inc., Charlotte, NC (US)

(72) Inventors: Ankit Singh, Apex, NC (US); Amit Kumar, Thane (IN); Lakshminarayana Paila, Frisco, TX (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 70 days.

(21) Appl. No.: 18/824,941

(22) Filed: Sep. 5, 2024

(65) Prior Publication Data

US 2026/0067246 A1 Mar. 5, 2026

(51) Int. Cl.
| | |
|---|---|
| *G06F 15/16* | (2006.01) |
| *G06F 9/50* | (2006.01) |
| *H04L 51/224* | (2022.01) |
| *H04L 67/306* | (2022.01) |

(52) U.S. Cl.
CPC ............ *H04L 51/224* (2022.05); *G06F 9/505* (2013.01); *H04L 67/306* (2013.01)

(58) Field of Classification Search
CPC ...... H04L 51/224; H04L 67/306; G06F 9/505
See application file for complete search history.

(56) References Cited

U.S. PATENT DOCUMENTS

| | | | | |
|---|---|---|---|---|
| 2016/0291808 A1 * | 10/2016 | Wang | .................... | G06F 16/957 |
| 2020/0213414 A1 * | 7/2020 | Sahani | .................. | H04L 67/306 |
| 2022/0171665 A1 * | 6/2022 | Baughman | ............... | G06N 5/04 |

* cited by examiner

*Primary Examiner* — Razu A Miah
(74) *Attorney, Agent, or Firm* — Alston & Bird LLP

(57) ABSTRACT

The present disclosure provides a method and system for dynamically transmitting notification messages to users of a client device. The method comprises, receiving one or more messages to be transmitted to one or more client applications on the client device. The method further comprises monitoring the one or more messages based on one or more user profiles and one or more contextual real-time metrics and determining if the one or more contextual real-time metrics exceeds a pre-defined threshold. In response to determining that the one or more contextual real-time metrics does not exceed the pre-defined threshold, the method comprises, transmitting the one or more messages to the one or more client applications on the client device based on one or more static rules embedded within the one or more messages. In response to determining that the one or more contextual real-time metrics exceeds the pre-defined threshold, the method comprises disabling the one or more static rules to temporality pause transmission of the one or more messages. The method further comprises, updating the one or more static rules for subsequent transmission of the one or more messages to the one or more client applications on the client device. A system for dynamically transmitting notification messages to users of a client device is also disclosed.

16 Claims, 7 Drawing Sheets

METHOD AND SYSTEM FOR DYNAMICALLY TRANSMITTING MESSAGES TO WORKFLOW APPLICATIONS

TECHNICAL FIELD

Embodiments of the present disclosure generally relate to managing dynamic work environments of business enterprises or organizations. Particularly, the present disclosure relates to a method and system for dynamically transmitting notification messages to users based on system load and infrastructure conditions.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Business enterprises or organizations may typically handle large amounts of data and information for planning and managing their business operations. Each enterprise may implement various business processes to manage their day-to-day operations and to achieve certain business goals or outcomes. Such business processes may typically involve a series of workflows to complete a particular business process or task. Each workflow may be a sequence of steps or actions that happen between the beginning and end of any task and carried out in a specific order by users of the enterprise to complete the task. For example, the workflows may require various users with different roles performing specific tasks like configuration, data analysis, project management, administrative tasks, approvals, executive responsibilities etc.

Business enterprises may have thousands of users or employees who may utilize various workflow applications for managing business operations. These workflow applications may serve, for example various purposes in the Pharma, Life Sciences, Bio Tech, Med Devices industry. Some non-limiting examples of such workflow applications may include Annual Product Quality Review, Quality System Management Review, Product Recall, Knowledge Management Review, Design Control, regulatory compliance, supply chain problems, etc.

As businesses evolve, the volume of data and information that needs to be handled increases manifold so does the complexity of the workflows associated with the execution of tasks. For example, for large business enterprises, the data that is manipulated is real-time, is voluminous and there is also a rapid rate of change of data. Therefore, messages or communications that are sent to users (customers, partners, clients, employees) utilizing these workflow applications for different business processes, need to be managed effectively considering the infrastructural and environmental conditions so as to ensure that the services are rendered to the users without affecting system performance and with improved operational efficiency.

Conventionally, notification messages are sent to users or personas of enterprises while navigating the workflow applications for completing an intended task or service associated with the operations of the business enterprise. Currently, the notification messages or events from source applications are sent to target message destinations or endpoints based on static rule definitions embedded in the payload content of the incoming source messages. When messages are routed based on such static rules, the allocation of computing resources, work or task distribution, load on infrastructure, costs, etc. may not be uniform which in turn may hamper the system performance.

Accordingly, there is a need for technical solutions to address the technical problems discussed above, and other inefficiencies of the prior arts. Particularly, as the number of workflow applications, services, users, destinations, and rules increases, there is a need to monitor the load on the infrastructure and allow flexibility to prevent the system's performance from being adversely affected.

The legacy approaches fail to provide efficient techniques for managing dynamic work environments of business enterprises based on event payload, infrastructural and aggregated environmental conditions, that not only enhances the operational efficiency of the business process but also provides enhanced scalability and flexibility.

Applicant has identified many technical challenges and difficulties associated with current solutions and through applied effort, ingenuity, and innovation, the applicant has provided a solution to the above-mentioned drawbacks.

SUMMARY OF THE INVENTION

In general, embodiments of the present disclosure relate to managing dynamic workload environments of business enterprises or organizations. Other implementations will be, or will become, apparent to one with skill in the art upon examination of the following figures and detailed description. It is intended that all such additional implementations be included within this description be within the scope of the disclosure and be protected within the scope of the following claims.

The present disclosure provides techniques for managing dynamic work environments of business enterprises. Specifically, the present disclosure provides a method and system for dynamically transmitting notification messages (notifications or messages) to one or more users operating one or more client devices in an enterprise setting. In an embodiment, techniques are provided for monitoring incoming source messages from a plurality of source applications and routing the messages efficiently to one or more client devices. The messages are monitored in real-time and routed to the message destinations by altering or disabling the static rules defined in the event payload and applying dynamic rules considering the dynamic parameters of the system including cost, load on infrastructure, task or work distribution, allocation of computing resources, among others. The monitoring of the messages helps in determining the endpoint to which the message is to be routed based on the dynamic conditions of the work environment, thereby balancing the load and improving the overall health of the system.

In one embodiment, the present disclosure provides a method for dynamically transmitting messages to one or more users of a client device. The method comprises, receiving one or more messages to be transmitted to one or more client applications on the client device. The method further comprises monitoring the one or more messages based on one or more user profiles and one or more contextual real-time metrics and determining if the one or more contextual real-time metrics exceeds a pre-defined threshold. In response to determining that the one or more contextual real-time metrics does not exceed the pre-defined threshold, the method comprises, transmitting the one or more messages to the one or more client applications on the client device based on one or more static rules embedded within the one or more messages. In response to determining that the one or more contextual real-time metrics exceeds the pre-defined threshold, the method comprises disabling the one or more static rules to temporality pause transmission of the one or more messages. The method further comprises, updating the one or more static rules for subsequent transmission of the one or messages to the one or more client applications on the client device.

In another embodiment, the present disclosure provides a system for dynamically transmitting messages to one or more users of a client device, the system comprising, a processor and a memory storing program instructions which, when executed by the processor, causes the processor to receive one or more messages to be transmitted to one or more client applications on the client device. The processor is further configured to monitor the one or more messages based on one or more user profiles and one or more contextual real-time metrics and determine if the one or more contextual real-time metrics exceeds a pre-defined threshold. In response to determining that the one or more contextual real-time metrics does not exceed the pre-defined threshold, the processor is configured to transmit the one or more messages to the one or more client applications on the client device based on one or more static rules embedded within the one or more messages. In response to determining that the one or more contextual real-time metrics exceeds the pre-defined threshold, the processor is configured to disable the one or more static rules to temporality pause transmission of the one or more messages and update the one or more static rules for subsequent transmission of the one or messages to the one or more client applications on the client device.

In yet another embodiment, the present disclosure provides a non-transitory computer-readable storage medium, storing program instructions executed by a processor to dynamically transmit messages to one or more users of a client device. The program instructions when executed by the processor, receives one or more messages to be transmitted to one or more client applications on the client device. The program instructions when executed by the processor, monitors the one or more messages based on one or more user profiles and one or more contextual real-time metrics and determines if the one or more contextual real-time metrics exceeds a pre-defined threshold. In response to determining that the one or more contextual real-time metrics does not exceed the pre-defined threshold, the program instructions executed by the processor transmits the one or more messages to the one or more client applications on the client device based on one or more static rules embedded within the one or more messages. In response to determining that the one or more contextual real-time metrics exceeds the pre-defined threshold, the program instructions executed by the processor disables the one or more static rules to temporality pause transmission of the one or more messages and updates the one or more static rules for subsequent transmission of the one or messages to the one or more client applications on the client device.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
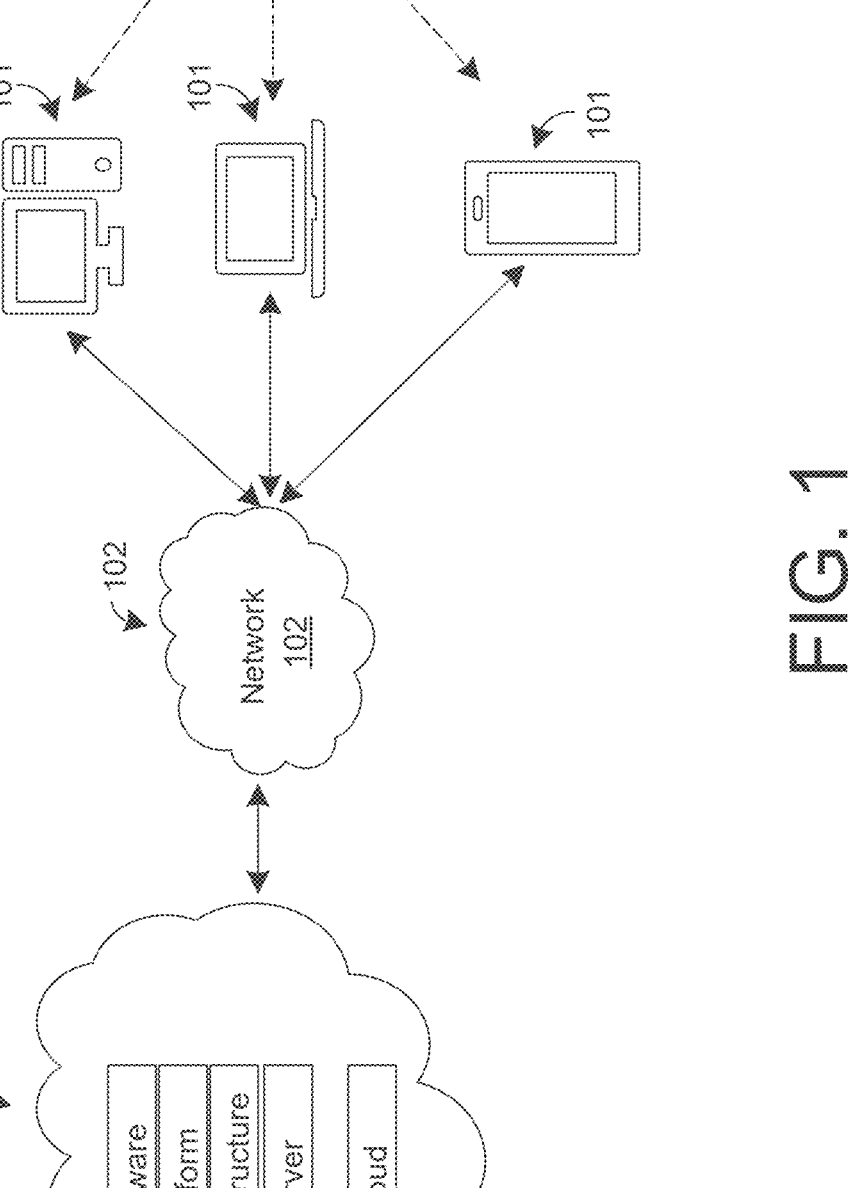
Figure 2:
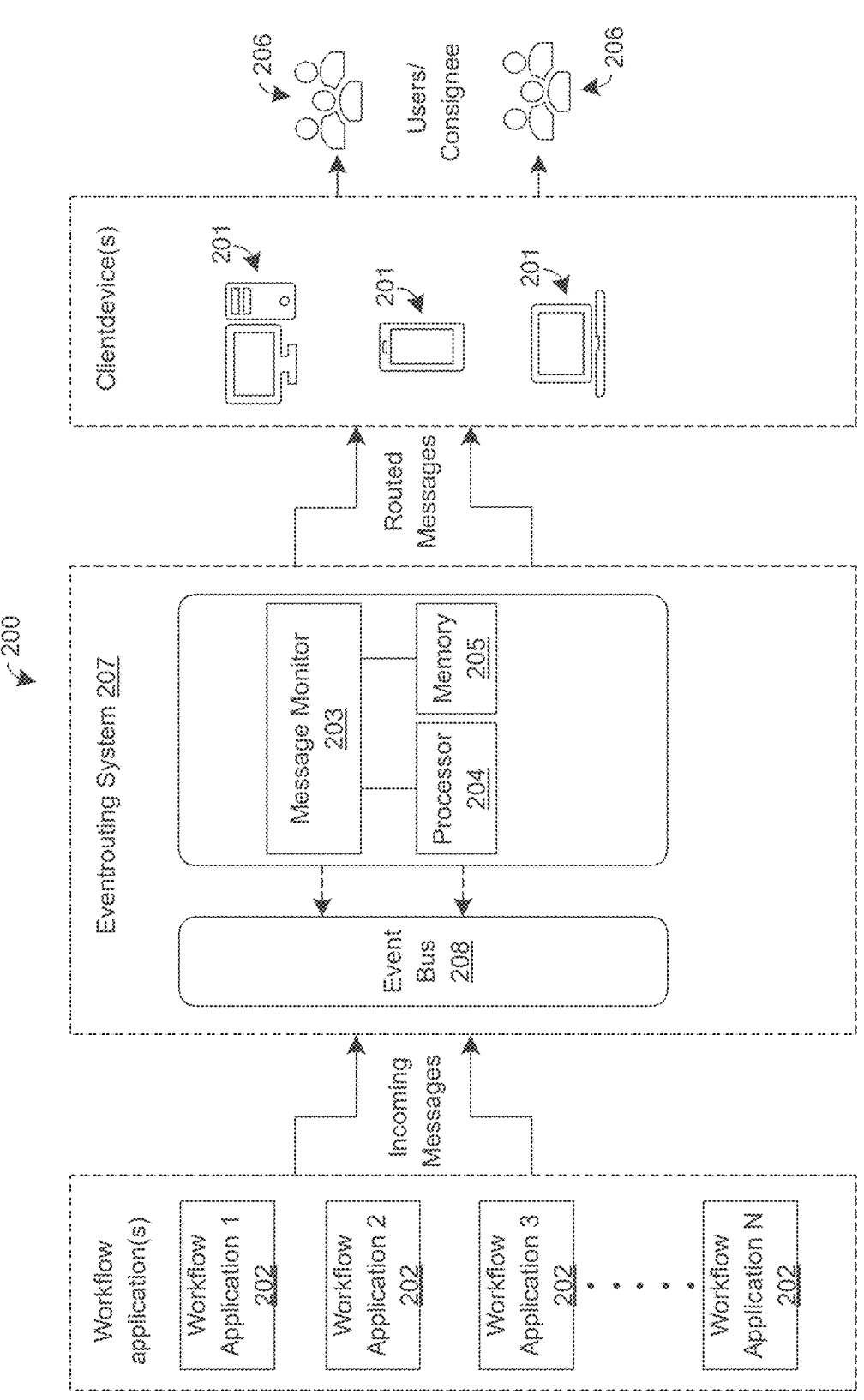
Figure 3:
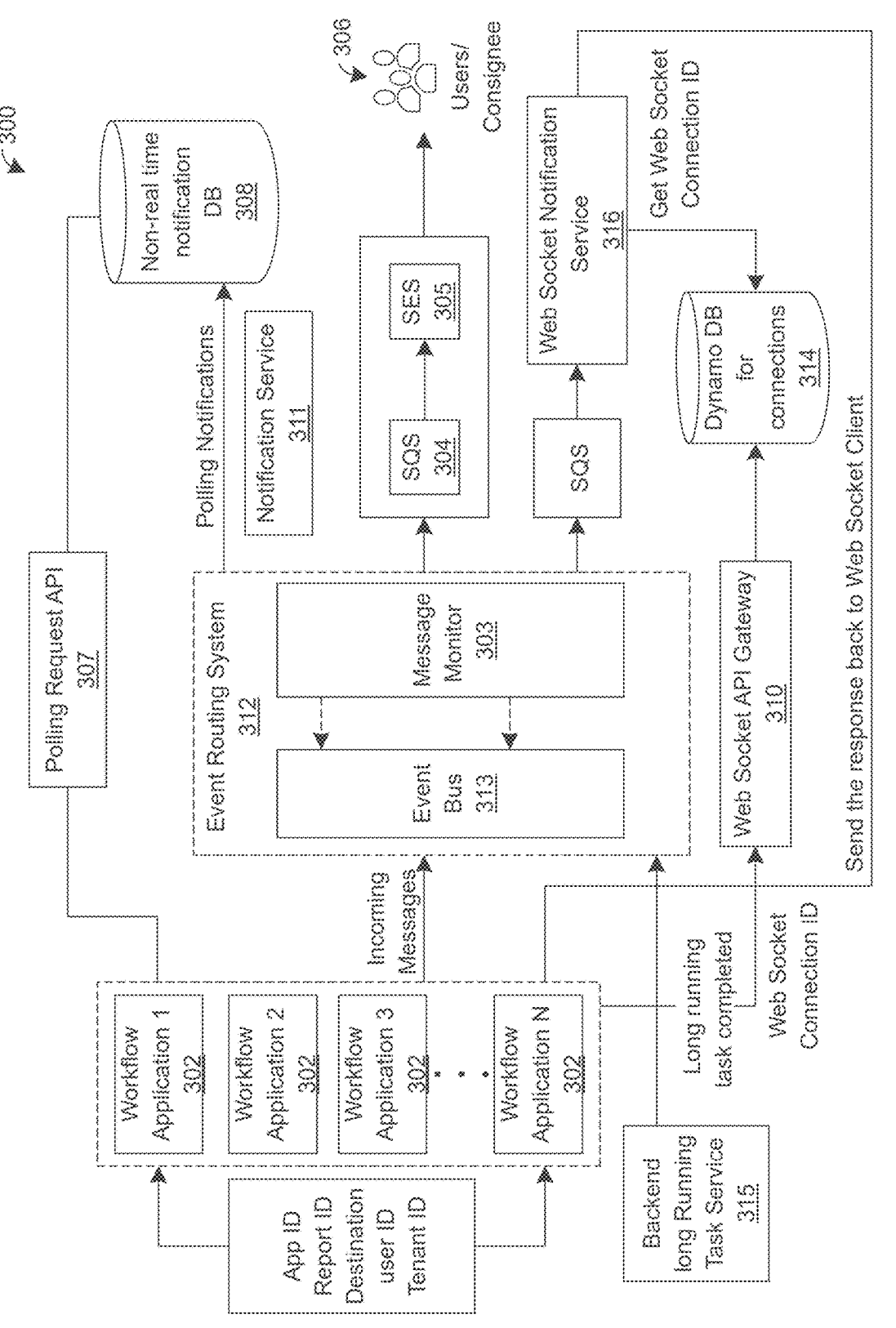
Figure 4:
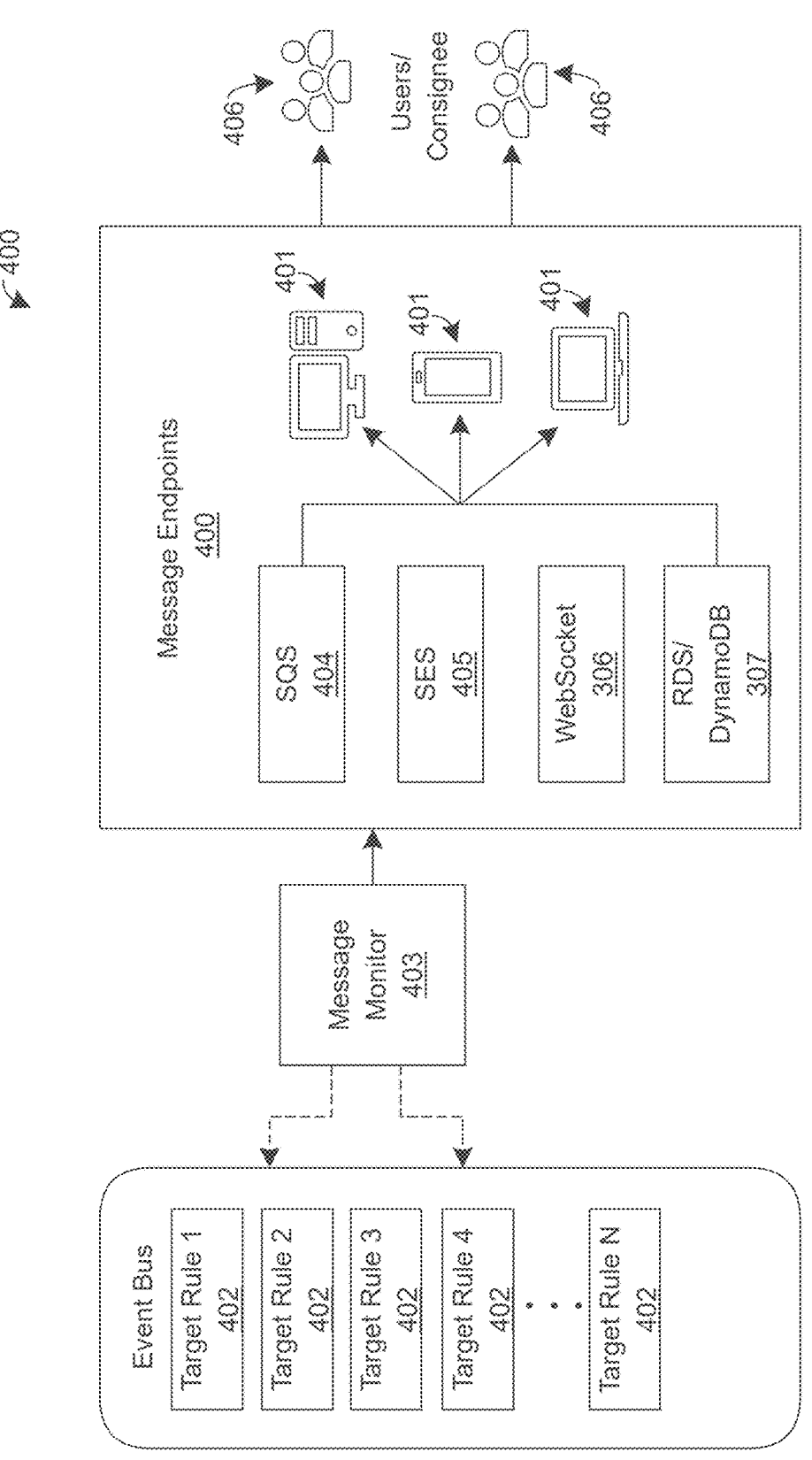
Figure 5:
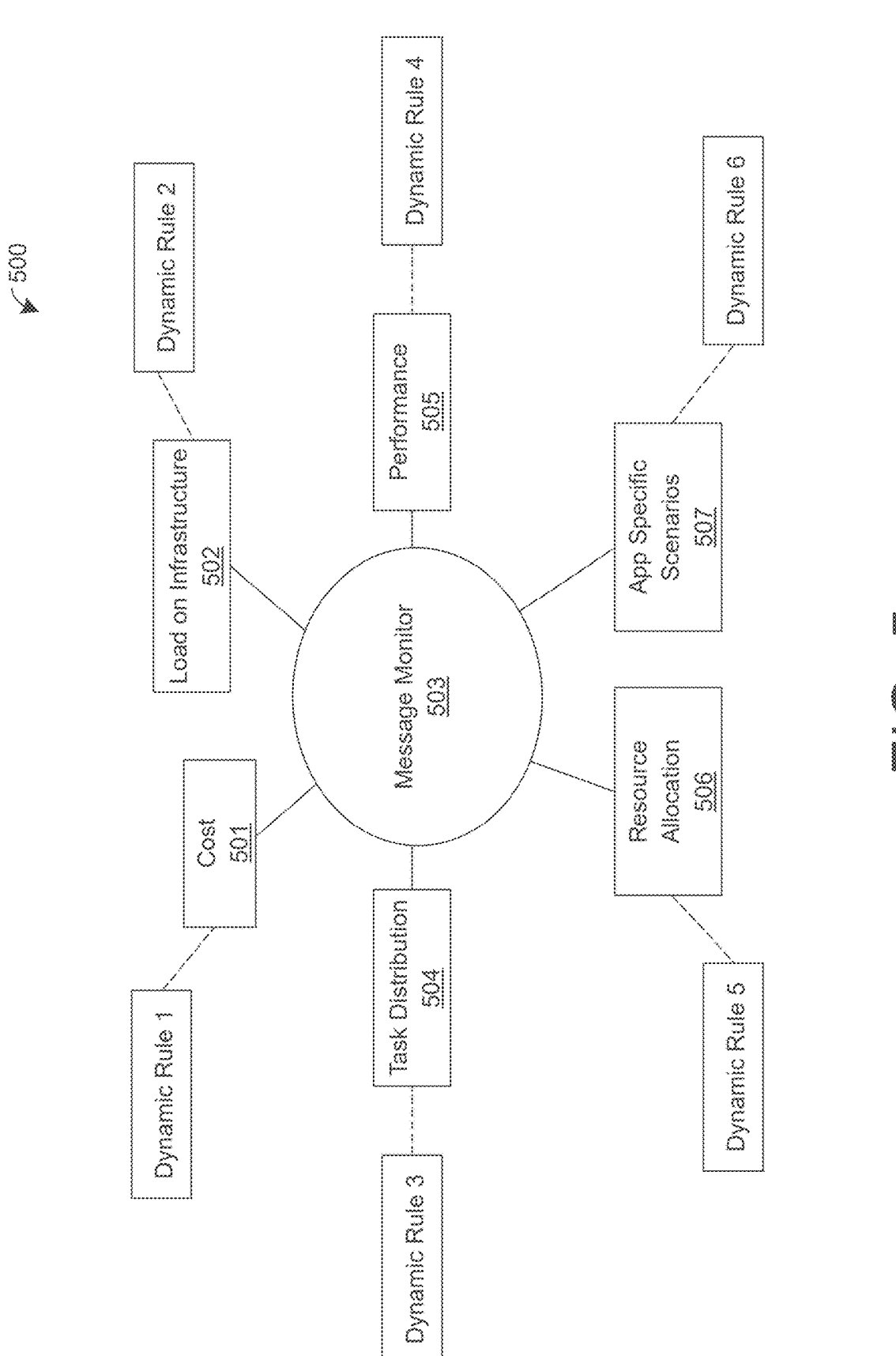
Figure 6:
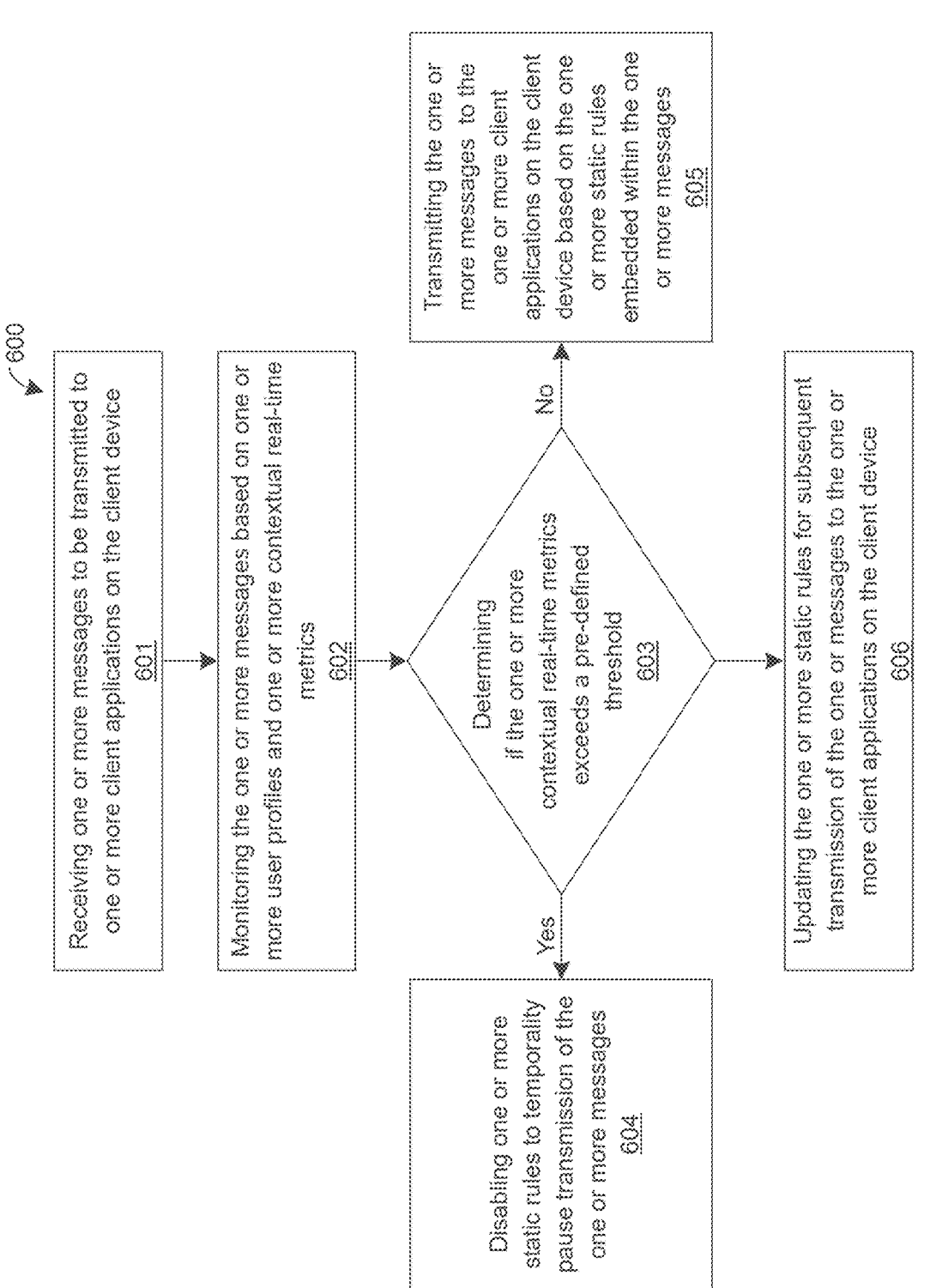
Figure 7:
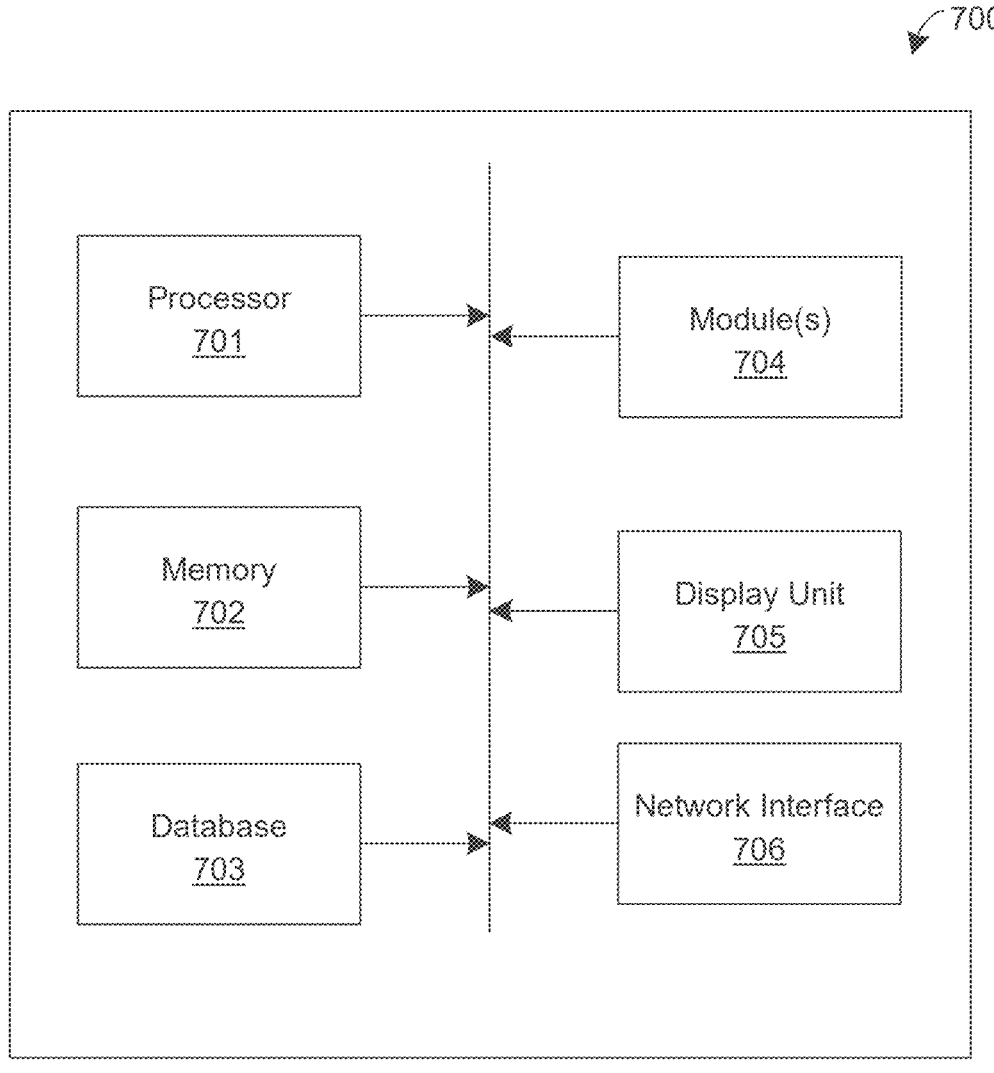

Having thus described the embodiments of the disclosure in general terms, reference now will be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary block diagram of a system for dynamically transmitting messages to users of a client device in accordance with one or more embodiments described herein;

FIG. 3 illustrates another exemplary block diagram of a system for dynamically transmitting messages to users of a client device in accordance with one or more embodiments described herein;

FIG. 4 illustrates an exemplary block diagram of an event bus implementation depicted in FIG. 3, in accordance with one or more embodiments described herein;

FIG. 5 illustrates a schematic diagram of a message monitor depicted in FIGS. 2-4, in accordance with one or more embodiments described herein;

FIG. 6 illustrates a flow diagram of a method for dynamically transmitting messages to users of a client device in accordance with one or more embodiments described herein;

FIG. 7 illustrates a general block diagram of a computing system, in accordance with one or more embodiments described herein.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

Typically, business enterprises implement various business processes for collecting and managing data and information required for the particular enterprise. A series of tasks or business processes may be performed by the organization or enterprise to achieve a business goal or outcome. The various internal processes can include designing, monitoring and controlling product design processes, production processes, manufacturing processes, sales processes and the like. Such business processes or tasks may typically involve a series of workflows to complete the particular task. Each workflow may be a sequence of steps or actions that happen between the beginning and end of any task and carried out in a specific order by users of the enterprise to complete the task. For example, there may be thousands of users (customers, partners, clients, employees) who may perform various tasks related to business operations.

One or more enterprises may be involved in manufacturing and distribution of one or more products and the products may include but not limited to healthcare related products including medical devices, medicines, therapeutic compositions. Workflow applications in a manufacturing unit of an enterprise may, for example include annual product quality review, quality management review, recalling of faulty products, quality control issues, supply chain problems, regulatory compliance, knowledge management review, design control etc. Other examples may include but not limited to intelligent audit planning, emergency response systems, among others. In the case of a workflow for intelligent audit planning, the attributes may be documents, signature forms, processes, and regulatory procedures. In the case of a workflow for manufacturing, the attributes may be delivery of products, product recall, failure of product meeting inventory among others. The workflows for these tasks require various users with different roles performing specific tasks like configuration, data analysis, project management, administrative tasks, approvals, executive responsibilities, etc.

The complexity of the workflows for completing one or more tasks may vary based upon the type of industry, size of the enterprise, and/or products or services that the industry caters to. In one instance, workflow may define steps or actions associated with performing a task, such as producing an item or delivering an item, and may identify the employees that may perform these tasks. In another instance, some complex workflow steps may include configuration of data sources, object models, chart configurations, table configurations, calculation configurations and the like. Therefore, when such complex workflows are navigated in real-time by thousands of users and clients by utilizing workflow applications in an enterprise setting, monitoring the load on the infrastructure and the dynamic work environments becomes crucial to balance the load on the system and improve performance.

Therefore, to improve the overall health of a system in an enterprise setting that manipulates large amounts of real-time data, the communications that are sent to the users need to be monitored and routed efficiently considering the dynamic parameters of the system such as the load on infrastructure, work or task distribution, cost considerations, allocation of computing resources. This not only reduces costs and resources but enhances effectiveness in managing business operations and improves business goals.

Accordingly, there is a need to provide an efficient system and framework that is flexible and is adaptable to evolving business requirements, making it easy for the users to navigate through the internal business processes within an enterprise without hampering the system performance.

There is also need to provide a system that balances the load on the infrastructure by monitoring dynamic conditions of the system to provide optimum performance and improving the overall health of the system.

There is also a need to provide an efficient system for managing dynamic work environments and infrastructure of business enterprises to provide flexibility and scalability, efficient allocation of computing resources, thereby improving the operational efficiency of the enterprises.

Accordingly, the present disclosure provides a method and system for managing dynamic work environments in an enterprise. Particularly, the present disclosure provides a method and system for dynamically routing notifications or messages to one or more client applications based on event payload, load on infrastructure and environmental conditions.

FIG. 1 illustrates an exemplary block diagram of an environment 100, in which the embodiments of the present disclosure may operate. Specifically, FIG. 1 illustrates a plurality of client devices 101. In an embodiment, the plurality of client devices 101 may be in operative communication with a cloud environment 103 over a network 102. In one or more embodiments, the one or more client devices 101 is integrated within or corresponds to a mobile computing device, a smartphone, a tablet computer, a mobile computer, a desktop computer, a laptop computer, a workstation computer, a wearable device, a virtual reality device, an augmented reality device, or another type of remote computing device. Although exemplary system 100 is shown with three client devices 101, any number of client devices may be supported.

In an embodiment, the plurality of client devices 101 may be operable by one or more users or clients 106 of an enterprise to manage the workflow of one or more tasks associated with a business operation typically to achieve a particular business goal or objective. The users 106 may utilize a plurality of workflow applications to complete one or more workflows associated with a particular business operation or service. For example, enterprises may be involved in manufacturing and distribution of one or more products, and the products may include but not limited to healthcare related products including medical devices, medicines, therapeutic compositions. Workflow applications of an enterprise in a non-limiting example may include annual product quality review, quality management review, recalling of faulty products, quality control issues, supply chain problems, regulatory compliance, etc. The workflows may require various users with different roles performing specific tasks like configuration, data analysis, project management, administrative tasks, approvals, executive responsibilities, etc.

According to various embodiments, a network 102 may be configured to provide communication between various components depicted in FIG. 1. In some embodiments, the network 102 may include a public network (e.g., the Internet), (e.g., an internal localized, or closed-off network between particular devices). In some other embodiments, the network 103 may be a hybrid network (e.g., a network enabling internal communications between particular connected devices and external communications with other devices). Such configuration(s) include, without limitation, a wired or wireless Personal Area Network (PAN), a Cloud network, Local Area Network (LAN), Metropolitan Area Network (MAN), Wide Area Network (WAN), and/or the like. In various embodiments, the network 102 may include one or more base station(s), relay(s), router(s), switch (cs), routing station(s), and/or the like.

According to various embodiments, the cloud environment 103 may include one or more servers and may provide different types of cloud computing services including but not limited to one or more services provided under Software as a Service (SaaS) category, services provided under Platform as a Service (Pass) category, services provided under Infrastructure as a Service (IaaS), category. In some embodiments, the cloud environment 103 may also include serverless computing. In some embodiments, the cloud infrastructure is operated solely for an organization called the private cloud. In some embodiments, the cloud infrastructure is shared by several organizations called the community cloud. In some other embodiments, the cloud infrastructure is made available to the general public or a large industry group and is owned by an organization selling cloud services, called the public cloud. In some embodiments, the cloud infrastructure is a composition of two or more clouds (private, community, or public) that remain unique entities but are bound together by standardized or proprietary technology that enables data and application portability.

Embodiments of the present disclosure may provide management of communications in workflow applications for a multi-tenant cloud-based system. Embodiments of the present disclosure may manage applications and data both in the cloud and on-premise. Embodiments of the present disclosure may support multi-channel access via web, mobile, and application programming interfaces ("APIs"). Embodiments of the present disclosure may manage access for different users, such as customers, partners, and employees. Embodiments of the present disclosure may integrate with new and existing applications and identities. Embodiments of the present disclosure may be scalable.

Embodiments of the present disclosure are based on a multi-tenant, microservices architecture for managing cloud-scale software services. Multi-tenancy refers to having one physical implementation of a service securely supporting multiple customers buying that service. A service is a software functionality or a set of software functionalities that can be reused by different clients for different purposes.

In an embodiment, the plurality of client devices 101 may be utilized by one or more clients or users 106 to connect to the cloud environment 103 via a secure communication channel over the network 102. The users 106 operating one or more client devices 101 may utilize a plurality of workflow applications to execute and complete the workflows.

FIG. 2 is an exemplary block diagram illustrating a system 200 for dynamically transmitting messages to users of one or more client devices in accordance with one or more embodiments described herein. In an embodiment, the system 200 may comprise an event routing system 207 which may include an event bus 208 and a message monitor 203. The event routing system 207 may also comprise a processor 204 communicably coupled to a memory 205. The processor 204 may store and execute instructions for implementing the functions of the message monitor 203. In an embodiment, the event bus 208 may receive a plurality of source messages or events to be routed to the one or more client devices 201 utilized by the clients or customers 206 for managing the workflows of various applications or services associated with business operations. For example, the users or employees of the business enterprise may utilize various workflow applications to execute and complete the workflows. In an embodiment, the event bus 208 may receive one or more messages from a plurality of workflow applications 202 to be routed to the one or more client devices 206. The message monitor 203 may monitor the plurality of incoming source messages from the event bus 208. In an embodiment, the event bus 208 may be an event bridge provided by a cloud service provider such as Amazon Web Services (AWS). In another embodiment, the event bus service may also be provided by other cloud service providers like Microsoft Azure, Google Cloud, etc. In an embodiment, the event bus 208 manages and routes events or messages within or between workflow applications.

Typically, notification messages are sent to users or personas of enterprises while navigating the workflow applications for completing an intended task or service associated with the operations of the business enterprise. The workflow applications may be utilized for completing various actions on the workflow, for instance quality review, management review or product recall, etc. Conventionally, the notification messages or events are sent to target destinations based on static rules defined by the customer's system administrator and embedded in the payload content of the incoming source messages. For example, the payload of the incoming source messages or events are parsed for specific fields like "user role", "destination", "application", "department" to route the notifications to client applications on the one or more client devices 201. When messages are routed based on such static rules, the allocation of computing resources, work or task distribution, load on infrastructure may not be uniform which in turn may hamper the system performance.

Therefore, in order to efficiently manage the allocation of computing resources and the load on infrastructure, the event routing system 207 may temporarily disable the static rules embedded in the payload content of the source message and apply dynamic rules in order to efficiently route the notification messages dynamically to the client applications on one or more client devices 201. In other words, the message monitor 203 may monitor the source messages from the event bus 208 and apply dynamic rules taking into consideration factors including cost, load on infrastructure, overall performance of the system, allocation of computing resources and various other application specific scenarios.

In an embodiment, the event routing system 207 may include a memory 205 operatively to the processor 204. The memory 205 may be non-transitory and may include, for example, one or more volatile and/or non-volatile memories. In some embodiments, the memory 210 includes or embodies an electronic storage device (e.g., a computer readable storage medium). In some embodiments, the memory 205 is configured to store information, data, content, applications, instructions, or the like, for enabling a system to carry out various operations and/or functions in accordance with example embodiments of the present disclosure.

In one or more embodiments, the system 200 may include one or more software modules or components for managing dynamic work environments in accordance with the one or more embodiments of the present disclosure. In an embodiment, the one or more software modules may include but not limited to the message monitor 203 which implements the functions of the event routing system 204 through the processor 204.

In one preferred embodiment, the system 100, 200 of the present disclosure may be configured as a cloud-based system. In various embodiments, the cloud environment 103 may be configured to run one or more services or software applications provided by one or more components of the system 200. In some embodiments, the services may be offered as web-based or cloud-based services to the users of the client devices 201. In another embodiment, one or more of the components of system 200 and/or the services provided by the components may also be implemented by one or more client devices 201. Users operating the client devices 201 may utilize one or more client applications to use the services provided by the components of the system 200.

In an embodiment, one or more modules (not shown) of the system 100, 200 may be implemented using electronic hardware, computer software, or any combination thereof. Whether such elements are implemented as hardware or software depends upon the application and design constraints imposed on the overall system. Examples of the systems may include computing systems (e.g., servers, datacenters, desktop computers, Internet of Things devices, etc.) and mobile computing systems (e.g., laptops, cell phones, etc.). Although components are described with respect to functional limitations, it should be understood that the particular implementations necessarily include the use of particular computing hardware. It should also be understood that in some embodiments certain of the components described herein include similar or common hardware.

The functions of the event routing system 207 of FIG. 2 are described in greater detail in FIGS. 3 and 4.

FIG. 3 illustrates an exemplary block diagram of a system 300 for dynamically transmitting messages to users of one or more client devices in accordance with one or more embodiments described herein. In an embodiment, the system 300 may be configured to manage dynamic work environments of business enterprises with an aim to provide optimum performance of the system. The system 300 includes an event routing system 312 comprising an event bus 313 and a message monitor 303. In an embodiment, the event bus 313 receives messages from a plurality of workflow applications 302. The incoming source messages to the event bus 313 are monitored by the message monitor 303 for efficiently routing and transmitting the messages to the one or more users 306 operating one or more client devices 201 (FIG. 2).

According to an embodiment, notification messages are sent to the one or more users 306 on the client device who utilize a plurality of workflow applications for completing various workflows. The workflow applications of an enterprise may in a non-limiting example include annual product quality review, quality management review, recalling of faulty products, quality control issues, supply chain problems, regulatory compliance, etc. The workflows for these tasks require various users with different roles performing specific tasks like configuration, data analysis, project management, administrative tasks, approvals, executive responsibilities, etc. The examples of workflows or tasks and workflow applications described above are provided for illustrative purposes only, and it is not intended that the present disclosure be limited to only these examples. The examples are provided merely to identify the type of workflows being analyzed. The present disclosure can also apply to other business and enterprise applications.

According to an embodiment, the event bus 313 receives one or more source messages or events from the one or more workflow applications 302 to be transmitted to one or more messaging services or endpoints on the one or more client devices operated by one or more users 306. The messages are monitored by the message monitor 303 based on profile of the one or more users and one or more contextual metrics of the system obtained in real-time. In some examples, the profile of the user may include a unique identifier of the user, a unique identifier of the organization or tenant, department, role of the user, etc. Some non-limiting examples of one more contextual metrics that may be monitored in real time by the message monitor 303 may include factors like cost on the system, load on the cloud infrastructure and task or work distribution, allocation of computing resources and aggregated environmental conditions.

Conventionally, the notifications are sent to the client applications on one or more client devices based on static rules embedded in the payload content of the message. The notification messages are either received in real time, as close to real-time as possible, or upon login/refresh from client-side application. However, as the number of applications, services, users, destinations, and rules increases, various contextual metrics like the load on different parts of cloud infrastructure, the task or work distribution, cost considerations and aggregated environmental conditions, etc. are required to be carefully monitored to allow flexibility to prevent the system's performance from being adversely impacted. Therefore, the static way of communication between various application's services in a serverless or distributed microservices network need to be made dynamic to enhance scalability and improve system performance. In an embodiment, a microservice is an independently deployable service. In one embodiment, microservices are small, highly decoupled services and each may focus on doing a small task.

According to an embodiment, the message monitor 303 may be an external auto-scalable service that may periodically monitor the messages emanating from the event bus 313 by applying system level checks as discussed supra before routing the messages to the message destinations or endpoints and making the notifications more focused. According to an embodiment, the message destination may include a WebSocket 316, or a database like RDS or DynamoDB 314 which could be later queried at the client's convenience. In some non-limiting examples, the message destinations may be messaging or application services provided by Amazon Web Services (AWS) that may include Simple Queue Service (SQS) 304 or Simple notification Service (SNS) 311 or Simple Email Service (SES) 305 or any other backend service 315 implementing a specific portion of the workflow. As is known, the SQS, the SNS and the SES are highly flexible and help to scale serverless or distributed microservices network. While SQS helps by sending, storing and receiving messages of any volume, the SNS provides push-based many-to-many messaging and the SES aids in sending emails from within the application between microservices, event-driven serverless systems. In an embodiment, the application services may also be provided by other cloud service provider similar to the AWS like Microsoft Azure, Google Cloud, etc.

In one implementation, the messages are transmitted to the one or more message destinations in real time or as close to real-time as possible. In another implementation, the non-real-time notifications are stored in a database 308, which can be later retrieved upon login or refresh of the client-side application via the polling request API 307. In an embodiment, the WebSocket API gateway 310 illustrated in FIG. 3 gets the WebSocketConnectionID and sends the response back to the WebSocket Client.

In an embodiment, the message monitor 303 may route the messages to the one or more users 306 based on the real-time monitoring of the contextual metrics. In one implementation, the message monitor 303 may be an external auto-scalable service which periodically monitors the messages to the event bus 313. In another implementation, the message monitor 303 may be a CRON job running dynamically at a specific interval repeatedly and adjusting the static rule automatically.

According to an embodiment, if the observed contextual metrics exceeds a pre-defined threshold, then the static rules stored in the payload content of the source messages set by the system administrator may be disabled or altered to temporarily pause transmission of the one or more messages to the message destinations. In one example, the threshold limit may be pre-defined based on the monitoring of the number of unique active web socket connections available across all applications. Based on the monitoring, the threshold limit may be defined like determining if maximum permissible limit of WebSocket connections is reached. If the maximum permissible limit of WebSocket connections is reached, the message is not routed to the WebSocket rather stored in a databased for later retrieval. The temporary pausing of the message thus balances the load on the infrastructure and the overall performance of the system. Thereafter, the one or more static rules 1-N are altered or updated to decide the message endpoint for the subsequent transmission.

In another example, contextual metrics such as the rate of real-time notification messages that are sent to one or more users with a particular ID is determined. If the number of real-time notifications has reached a threshold limit, the messages may be routed to a queuing service like SQS 304 or saved at a Database for retrieval. This will alleviate one individual user becoming overwhelmed by a large number of real time messages and missing any important information.

In another implementation, the message monitor 303 may monitor the delays associated with relaying messages on queues that are too full. For example, if there is a queue on which the one or more users 306 place a message for the next step of the workflow which is too full, then instead of placing more load on that queue, either the message may be stored on a temporal DB for consumption at a later point or may continue to stay on the event bus violating the static rule in favor of the load management.

In yet another implementation, the contextual metric like cost associated with moving a specific number of messages on a specific infrastructure service like SES may be monitored by the message monitor 303. For example, if sending beyond x number of emails within a specific time limit may move the pricing or cost tier to the next level, then other options like web socket notifications 316 or poll-based notifications 308 (using RDS or DynamoDb) may be favored in order to reduce the cost on the resources.

According to an embodiment, if the contextual metrics does not exceed the pre-defined threshold, the event bus 313 may continue to transmit the one or more messages to the to one or more client applications based the static rules embedded within the one or more messages. In an embodiment, the message monitor 303 may update the one or more static rules for subsequent transmission of the one or messages to the one or more workflow client on the client device. In an embodiment, the message monitor 303 may rank the one or more contextual real-time metrics based on priority and based on users' or clients' requirements. For example, the ranks for the various contextual metrics may be flexible depending on the user or client requirements and conditions. In an embodiment, the message monitor 303 may prioritize the updating of the one or more static rules embedded within the one or more messages based on the rank of the one or more contextual real-time metrics.

The functions of the event bus 313 of the event routing system 312 of FIG. 3 are described in greater detail in FIG. 4.

FIG. 4 illustrates an exemplary block diagram of an event bus implementation 408 for dynamically transmitting messages to users of one or more client devices in accordance with one or more embodiments described herein. Specifically, the event bus 408 enables transmitting the incoming messages from the plurality of workflow applications 302 (FIG. 3). The one or more client devices 401 are operable by one or more users 406 while navigating the workflow applications. The one or more messaging services to which the messages are routed may include endpoints or delivery channels, 404, 405, 406, 407. Conventionally, the notification messages or events received by the event bus 408 are sent to target message destinations based on static rules defined by the customer's system administrator and embedded in the payload content of the incoming source messages. The payload of the incoming source messages or events are parsed for specific fields like "user role", "destination", "application", "department" among others to route the notifications to the one or more client devices 401. When messages are routed based on such static rules, the allocation of computing resources, work or task distribution, load on infrastructure may not be uniform which in turn may hamper the system performance.

Therefore, in order to efficiently manage the allocation of resources and the load on cloud infrastructure, the messages emanating from the event bus 407 are monitored by the message monitor 403 and routed efficiently to the target message destinations 404, 405, 406, 407 by disabling or altering the static rule definitions of the incoming messages and applying dynamic rules for routing the notifications thereby balancing the load and overall health of the system. The message destinations or endpoints 404, 405, 406, 407 illustrated in FIG. 4 may be application services like the SQS, SES or a WebSocket or stored in a database like the RDS or DynamoDB for later retrieval.

According to an embodiment, the event bus 408 may have static target rules 1 to N, 402 based on which the messages are transmitted to the target message destinations 404, 405, 406, 407 or client applications. In one implementation, one or more target rules may be disabled by the message monitor 403 to enable dynamic transmission of messages. According to an embodiment, the message monitor 403 may monitor various contextual system metrics in real time in order to alter or disable the static rules. The contextual metrics that are monitored may include but not limited to parameters like the cost, load on infrastructure, performance of the system, load on infrastructure, the work or task distribution, among others. In an embodiment, if the contextual metrics exceeds a pre-defined threshold, the message monitor 403 may disable one or more target rules 1-N, 402 to temporarily pause the relay or transmission of messages to the one or more message destinations 404, 405, 406, 407. The disabled static rules are updated or altered to dynamically transmit the messages to the one or more message destinations on the subsequent transmission.

The message monitor 403 may define certain threshold conditions in order to determine when the static rules 1-N are to be disabled and when dynamic rules are to be applied for transmission of messages to one or more message destinations 404, 405, 406, 407 on one or more client devices 401 operable by the one or more users 406. According to an embodiment, the message monitor 403 may evaluate various contextual real-time metrics based on dynamic conditions of the system discussed supra. In one implementation, the message monitor 403 may monitor the number of unique active web socket connections available across all applications and define certain threshold such as determining if maximum permissible limit of WebSocket connections is reached. For example, when the notification messages from the event bus 408 are intended for the message destination 406 which is a WebSocket, and if a threshold of maximum permissible limit of WebSocket connections is reached, the message monitor 403 may disable one or more target rules 1-N to temporarily pause the transmission of the message to the WebSocket 406 and save the message in the DynamoDB 407. This helps to determine if the next message is to be transmitted to the WebSocket 406 or saved in DynamoDB 407. The temporary pausing of the message thus balances the load on the infrastructure and the performance of the overall system. Thus, the one or more target rules 1-N are altered or updated to decide the message endpoint for the subsequent transmission.

In another implementation, contextual metrics such as the rate of real-time notification messages that are sent to one or more users 406 with a particular ID is determined. If the number of real-time notification messages have reached a defined threshold limit, the messages may be routed to a queuing service like SQS 404 or saved at a Database for retrieval. This will alleviate one individual user becoming overwhelmed by a large number of real time messages and missing any important information. The process also helps to achieve measurable task distribution amongst possibly employees or users within the same department or with similar roles. For instance, users or employees may help sign 2 different Annual Product Quality Reports (APQR) serving as each other's delegates, and this can be a dynamic rule based on the overall condition of the system.

In another implementation, the message monitor 403 may monitor the delays associated with relaying messages on queues that are too full. For example, if there is a queue on which the one or more users 406 place a message for the next step of the workflow which is too full, then instead of placing more load on that queue, either the message may be stored on a temporal DB for consumption at a later point or may continue to stay on the event bus violating the static rule in favor of the load management.

In yet another implementation, the contextual metric like cost associated with moving a specific number of messages on a specific infrastructure service like SES may be monitored by the event bus 403. For example, if sending beyond x number of emails within a specific time limit may move the pricing or cost tier to the next level, then other options like web socket notifications 316 or poll-based notifications 308 (using RDS or DynamoDb) may be favored in order to reduce the cost on the resources.

According to an embodiment, the message monitor 403 may prevent routing when it is processing the messages, for example say every 15 minutes. The message monitor 403 may observe the various contextual metrics simultaneously in a multithreaded manner. In one implementation, the message monitor 403 may be an external auto-scalable service which periodically monitors the messages to the event bus 408. In another implementation, the message monitor 403 may be a CRON job running dynamically at a specific interval repeatedly and adjusting the static rule automatically.

FIG. 5 illustrates a schematic diagram of a message monitor depicted in FIGS. 2-4, in accordance with one or more embodiments described herein. Specifically, the message monitor 503 may monitor in real-time the contextual metrics of the work environment in an enterprise setting for dynamic routing of messages to the one or more client devices 201, 401. The contextual metrics that are being monitored may vary based on the type of application, the type of services and the industry. In an exemplary embodiment, the contextual metrics may include factors like cost 501, load on infrastructure 502, performance of the system 505, work or task distribution 504, allocation of resources 506, other application specific scenarios 507, among others. In an embodiment, the message monitor 503 may disable the static rules of the event payload to temporarily pause the relay of the messages to the target destinations if it is determined that the contextual metrics exceeds a pre-defined threshold limit. The various exemplary threshold limit conditions based on which the static rules are disabled and dynamic rules applied are discussed in FIGS. 3 and 4 and are not repeated here for the sake of brevity. In an embodiment, the dynamic rules 1 to 6 are applied in order to determine the message endpoints for the subsequent transmission. In one implementation, the message monitor 503 may be an external auto-scalable service which periodically monitors the messages to the event bus 408 (FIG. 4). In another implementation, the message monitor 503 may be a CRON job running dynamically at a specific interval repeatedly and adjusting the static rule automatically. The CRON job may also rank or assign weights to the contextual metrics 501, 502, 504, 505, 506, 507 so that the adjustment of a static rule of relaying to a destination can be prioritized. In an embodiment, the message monitor 503 may observe the various contextual metrics simultaneously in a multithreaded manner. The messages may be monitored in possibly different threads per service and different factors per thread.

FIG. 6 illustrates an exemplary method for dynamically transmitting one or more messages to users of one or more client devices in accordance with one or more embodiments described herein. The method, 600 may be implemented by the system as described above in FIGS. 2, 3, 4. The method 600 is illustrated as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. The order in which the operations are described is not intended to be construed as a limitation, and any number of the described operations can be combined in any order and/or in parallel to implement the method.

According to an embodiment, the method 600 may be implemented by one or more processors or modules illustrated and explained through FIGS. 1-4, therefore detailed explanation of the same is omitted here for the sake of brevity.

The method begins at step 601, wherein the method 600 includes receiving one or more messages to be transmitted to one or more client applications on the one or more client devices 101, 201, 301, 401. In an embodiment, the plurality of client devices 101, 201, 301, 401 may be operable by one or more users 106, 206, 306, 406 of an enterprise or organization to manage dynamic work environments and its associated business operations typically to achieve a particular business goal or objective. For example, an enterprise may have thousands of users (partners, clients, employees) who may perform various workflows related to business operations. The workflow applications in a manufacturing unit of an enterprise may, for example may include but not limited to annual product quality review, quality management review, recalling of faulty products, quality control issues, supply chain problems, regulatory compliance, etc. The workflows for these tasks require various users with different roles performing specific tasks like configuration, data analysis, project management, administrative tasks, approvals, executive responsibilities, etc.

In some non-limiting examples, the message destinations could be messaging or application services provided by Amazon Web Services (AWS) that may include Simple Queue Service (SQS) 304 or Simple notification Service (SNS) 311 or Simple Email Service (SES) 305 or any other backend service 315 implementing a specific portion of the workflow. In an embodiment, the messaging services may also be provided by other cloud service providers like the Microsoft Azure, as an alternative to the AWS. While SES, for example may be used for email-related tasks and notifications within a workflow, SNS is a messaging service for sending notifications to various endpoints. SQS, may be used for managing and queuing messages between different components of the workflow and WebSocket may be used for sending communications in real-time.

At 602, the method 600 includes monitoring the one or more messages based on one or more user profiles and one or more contextual real-time metrics. In an embodiment, the operations at step 602 may be performed by the message monitor 303, 403, 503 of FIGS. 3,4, 5. For instance, the profile of the user may include a unique identifier of the user, a unique identifier of the organization or tenant, department, role of the user, etc. Some non-limiting examples of one more contextual metrics that may be monitored in real time by the message monitor 503 may include factors like cost on the system, load on the cloud infrastructure and task or work distribution, allocation of computing resources, application specific scenarios and aggregated environmental conditions.

At 603, the method 600 includes determining if the one or more contextual real-time metrics exceeds a pre-defined threshold. In an embodiment, the operations at step 602 may be performed by the message monitor 303, 403, 503 of FIGS. 3,4, 5. The message monitor 503 may define certain threshold conditions in order to determine when the static rules are to be disabled and when dynamic rules are to be applied for transmission of messages to one or more client devices operable by the one or more users. According to an embodiment, the message monitor 503 may evaluate various contextual real-time metrics based on dynamic conditions of the system discussed supra. In one implementation, the number of unique active web socket connections available across all applications are monitored and certain threshold limit is defined such as determining if maximum permissible limit of WebSocket connections is reached. For example, when the notification messages from the event bus are intended for the message destination which is a WebSocket, and if a threshold of maximum permissible limit of Web-Socket connections is reached, the message monitor 503 may disable one or more static rules 1-N to temporarily pause the transmission of the message to the WebSocket and save the message in the DynamoDB. This helps to determine if the next message is to be transmitted to the WebSocket 406 or saved in DynamoDB 407. The temporary pausing of the message thus balances the load on the infrastructure and the performance of the overall system. Thus, the one or more target rules 1-N are altered or updated to decide the message endpoint for the subsequent transmission.

In another implementation, contextual metrics such as the rate of real-time notification messages that are sent to one or more users with a particular ID is determined. If the number of real-time notification messages have reached a defined threshold limit, the messages may be routed to a queuing service like SQS or saved at a Database for retrieval. This will alleviate one individual user becoming overwhelmed by a large number of real time messages and missing any important information. The process also helps to achieve measurable task distribution amongst possibly employees or users within the same department or with similar roles. For instance, users or employees may help sign 2 different Annual Product Quality Reports (APQR) serving as each other's delegates, and this can be a dynamic rule based on the overall condition of the system.

At 604, the method 600 includes disabling the one or more static rules to temporality pause the transmission of the one or more messages in response to determining that the one or more contextual real-time metrics exceeds a pre-defined threshold at step 603. In an embodiment, the operations at step 604 may be performed by the message monitor 503. In one implementation, the contextual metric like cost associated with moving a specific number of messages on a specific infrastructure service like SES may be monitored by the message monitor 503. For example, if sending beyond x number of emails within a specific time limit may move the pricing or cost tier to the next level, then other options like web socket notifications or poll-based notifications (using RDS or DynamoDb) may be favored in order to reduce the cost on the resources.

At step 605, the method includes transmitting the one or more messages to the one or more client applications on the client device based the static rules embedded within the one or more messages, in response to determining that the one or more contextual real-time metrics does not exceed the pre-defined threshold at step 604. In an embodiment, the operations at step 604 may be performed by the message monitor 503. In an embodiment, the notification messages are either received in real time, as close to real-time as possible, or upon login/refresh from client-side application.

At step 606, the method includes updating the one or more static rules for subsequent transmission of the one or mes-sages to the one or more client applications on the client device. In an embodiment, the operations at step 604 may be performed by the message monitor 503. In one implementation, the message monitor 503 may monitor the delays associated with relaying messages on queues that are too full. For example, if there is a queue on which the one or more users place a message for the next step of the workflow which is too full, then instead of placing more load on that queue, either the message may be stored on a temporal DB for consumption at a later point or may continue to stay on the event bus violating the static rule in favor of the load management.

In an embodiment, the method includes ranking the one or more contextual real-time metrics based on priority and based on users' or clients' requirements. For example, the ranks for the various contextual metrics may be flexible depending on the user or client requirements and conditions. In an embodiment, the method further includes prioritizing the updating of the one or more static rules embedded within the one or more messages based on the rank of the one or more contextual real-time metrics.

FIG. 7 illustrates a general block diagram of an exemplary computing system 700 used in dynamic message transmission system 200 according to an embodiment of the present disclosure. The computing system 700 includes a processor 701 which may be a single processing unit or a number of units, all of which could include multiple computing units. The processor 701 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 701 is configured to fetch and execute computer-readable instructions and data stored in a memory 702.

The memory 702 may be any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

In an example, the computing system 700 may include one or more software modules or components 704 for managing dynamic work environments in accordance with the one or more embodiments of the present disclosure. In an embodiment, the one or more software modules 704 may include a program, a subroutine, a portion of a program, a software component or a hardware component capable of performing a stated task or function. As used herein, the modules may be implemented on a hardware component such as a server independently of other modules, or a module can exist with other modules on the same server, or within the same program. The module(s) 704 may be implemented on a hardware component such as processor one or more microprocessors, microcomputers, microcontrollers, digital signal processors, central processing units, state machines, logic circuitries, and/or any devices that manipulate signals based on operational instructions. The module(s) 704 when executed by the processor 701 may be configured to perform any of the described functionalities. Specifically, the module(s) 704 may be configured to implement the dynamic transmission of messages enabling efficient, scalable and flexible event-driven architecture.

The computing system 700 may comprise a database 703 and may be implemented with integrated hardware and software. The hardware may include a hardware disk controller with programmable search capabilities or a software system running on general-purpose hardware. Examples of databases are but not limited to, in-memory databases, cloud databases, distributed databases, embedded databases, and the like. The database amongst other things, serves as a repository for storing data processed, received, and generated by one or more of the processors 701, and the module(s) 704. In an embodiment, the modules 704 may be implemented with an AI module.

The computing system 700 comprises a display unit 705 that includes a computer monitor, a touch screen, an output device capable of displaying the graphics, and the like. The display unit 705 is configured to display visual output in desktops, laptops, and workstations.

The computing system 700 comprises a network interface 706 configured to provide and establish communication with any electronic device via a public network, private network, or any wireless communication technology.

Embodiments of the present disclosure may thus provide an efficient system and method for balancing the load on the infrastructure in dynamic business environments. The system is aimed to provide optimum performance and is adaptable to evolving business requirements, making it easy for the users to navigate through the internal business processes within an enterprise. The disclosed techniques aids in improving the overall health of the system by providing scalable processing, reducing costs, optimizing resources, reducing time spent on repetitive tasks, thereby providing enhanced system performance.

The disclosed system and method provide techniques for providing a reliable and scalable way to process and route events between applications and services. Embodiments of the disclosure also enable flexible and cost-effective way of processing data between services and applications by managing the work environments dynamically, resulting in improved operational efficiency of the business processes and system performance.

The disclosed system and method may also leverage the possibility of using Artificial intelligence (AI) models to implement the various functionalities disclosed herein. The AI models may be utilized to collect contextual metrics in real-time and manage the dynamic work environments of the business enterprises efficiently.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment). The present disclosure intends to include specific reference to all combinations and sub combinations of physically compatible features, components, apparatuses, and processes described herein. As used herein, the term "or" is used in both the alternative and conjunctive sense, unless otherwise indicated. Use of any such aforementioned terms, or similarly interchangeable terms, should not be taken to limit the spirit and scope of embodiments of the present disclosure. As used in the specification and the appended claims. The singular form of "a," "an," and "the" include plural references unless otherwise stated. The terms "includes" and/or "including," when used in the specification, specify the presence of stated features, elements, and/or components, and/or groups thereof.

In an embodiment, the functional units have been labeled as modules, in order to more particularly emphasize their implementation independence. For example, a module may be implemented as a hardware or a software by various types of processors. A module of executable code may, for instance, comprise one or more physical or logical blocks of computer instructions, which may, for instance, be organized as an object, procedure, or function. Nevertheless, the executables of a module need not be physically located together, but may comprise disparate instructions stored in different locations which, when joined logically together, comprise the module and achieve the stated purpose for the module.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

Processor may be embodied in a number of different ways. In various embodiments, the use of the terms "processor" should be understood to include a single core processor, a multi-core processor, multiple processors and/or one or more remote or "cloud" processor(s). In some example embodiments, processor may include one or more processing devices configured to perform independently. In some embodiments, the processor includes hardware, software, firmware, and/or a combination thereof that performs one or more operations described herein.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments, a storage system or other management entity within the artificial intelligence and machine learning infrastructure may also implement automated training with continuous learning based on new data.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed:

1. A method for dynamically transmitting messages to one or more users of a client device, comprising: receiving one or more messages to be transmitted to one or more client applications on the client device;

monitoring the one or more messages based on one or more user profiles and one or more contextual real-time metrics;

determining if the one or more contextual real-time metrics exceeds a pre-defined threshold;

in response to determining that the one or more contextual real-time metrics does not exceed the pre-defined threshold, transmitting the one or more messages to the one or more client applications on the client device based on one or more static rules embedded within the one or more messages;

in response to determining that the one or more contextual real-time metrics exceeds the pre-defined threshold, disabling the one or more static rules to temporarily pause transmission of the one or more messages;

ranking the one or more contextual real-time metrics based on user requirements, and prioritizing the updating of the one or more static rules embedded within the one or more messages based on the ranking of the one or more contextual real-time metrics; and updating the one or more static rules for subsequent transmission of the one or more messages to the one or more client applications on the client device.

2. The method of claim 1, wherein the one or more contextual real-time metrics include at least one of cost, system performance, load on infrastructure, allocation of system resources and task distribution.

3. The method of claim 1, further comprising concurrently monitoring the one or more messages based on the one or more contextual real-time metrics.

4. The method of claim 1, wherein the one or more messages are transmitted to one or more message destinations including a WebSocket-based connection or a database.

5. The method of claim 4, wherein the one or more message destinations further include one of an email service, a notification service, and a backend service, implementing a specific portion of workflow.

6. The method of claim 1, wherein the pre-defined threshold comprises determining if a maximum permissible limit of WebSocket connections is reached or determining if number of real-time messages sent to a particular user has reached a maximum limit.

7. The method of claim 1, wherein the updating of the one or more static rules is performed at pre-defined intervals.

8. The method of claim 1, wherein the one or more messages are received during login to a client application, or refreshing of the client application.

9. A system for dynamically transmitting messages to one or more users of a client device, the system comprising: a processor; and a memory storing program instructions which, when executed by the processor, causes the processor to:

receive one or more messages to be transmitted to one or more client applications on the client device;

monitor the one or more messages based on one or more user profiles and one or more contextual real-time metrics;

determine if the one or more contextual real-time metrics exceeds a pre-defined threshold;

in response to determining that the one or more contextual real-time metrics does not exceed the pre-defined threshold, transmit the one or more messages to the one or more client applications on the client device based on one or more static rules embedded within the one or more messages;

in response to determining that the one or more contextual real-time metrics exceeds the pre-defined threshold, disable the one or more static rules to temporarily pause transmission of the one or more messages;

wherein the processor is configured to rank the one or more contextual real-time metrics based on user requirements, and prioritize the updating of the one or more static rules embedded within the one or more messages based on the rank of the one or more contextual real-time metrics; and update the one or more static rules for subsequent transmission of the one or more messages to the one or more client applications on the client device.

10. The system of claim 9, wherein the one or more contextual real-time metrics include at least one of cost, system performance, load on infrastructure, allocation of system resources and task distribution.

11. The system of claim 9, wherein the processor is configured to concurrently monitor the one or more messages based on the one or more contextual real-time metrics.

12. The system of claim 9, wherein the one or more messages are transmitted to one or more message destinations including a WebSocket-based connection or a database.

13. The system of claim 12, wherein the one or more message destinations further include one of an email service, a notification service, a backend service, implementing a specific portion of workflow.

14. The system of claim 9, wherein the pre-defined threshold comprises determining if a maximum permissible limit of WebSocket connections is reached or determining if number of real-time messages sent to a particular user has reached a maximum limit.

15. The system of claim 9, wherein the processor is configured to update the one or more static rules at pre-defined intervals.

16. A non-transitory computer-readable storage medium, storing program instructions for dynamically transmitting messages to one or more users of a client device, the program instructions, when executed, perform the steps of:

receiving one or more messages to be transmitted to one or more client applications on the client device;

monitoring the one or more messages based on one or more user profiles and one or more contextual real-time metrics; determining if the one or more contextual real-time metrics exceeds a pre-defined threshold;

in response to determining that the one or more contextual real-time metrics does not exceed the pre-defined threshold, transmitting the one or more messages to the one or more client applications on the client device based on one or more static rules embedded within the one or more messages;

in response to determining that the one or more contextual real-time metrics exceeds the pre-defined threshold, disabling the one or more static rules to temporarily pause the transmission of the one or more messages;

ranking the one or more contextual real-time metrics based on user requirements, and prioritizing the updating of the one or more static rules embedded within the one or more messages based on the ranking of the one or more contextual real-time metrics; and updating the one or more static rules for subsequent transmission of the one or more messages to the one or more client applications on the client device.

* * * * *